(12) United States Patent
Brunazzi et al.

(10) Patent No.: US 8,992,332 B2
(45) Date of Patent: Mar. 31, 2015

(54) TORQUE LIMITING DEVICE, PARTICULARLY FOR POWER TRANSMISSION ELEMENTS

(71) Applicant: Comer Industries S.p.A., Milan (IT)

(72) Inventors: Achille Brunazzi, Frazione Santa Vittoria (IT); Gabriele Gualdi, Villa Poma (IT); Gianni Tenca, Viadana (IT)

(73) Assignee: Comer Industries S.p.A., Milan (IT)

( * ) Notice: Subject to any disclaimer, the term of this patent is extended or adjusted under 35 U.S.C. 154(b) by 0 days.

(21) Appl. No.: 14/023,907

(22) Filed: Sep. 11, 2013

(65) Prior Publication Data

US 2014/0073440 A1 Mar. 13, 2014

(30) Foreign Application Priority Data

Sep. 11, 2012 (IT) .............................. MO2012A0215

(51) Int. Cl.
  *F16D 7/08* (2006.01)
  *F16D 7/00* (2006.01)
  *F16D 43/206* (2006.01)

(52) U.S. Cl.
  CPC .............. *F16D 7/005* (2013.01); *F16D 43/206* (2013.01)
  USPC ........................................................ 464/36

(58) Field of Classification Search
  CPC ...... F16D 7/005; F16D 43/204; F16D 43/206
  USPC ............ 464/35, 36, 38, 39; 192/56.43, 56.54, 192/56.57, 56.62
  See application file for complete search history.

(56) References Cited

U.S. PATENT DOCUMENTS

| 2,238,583 | A | | 4/1941 | Dodge | |
| 3,307,664 | A | | 3/1967 | Halsall | |
| 3,653,226 | A | * | 4/1972 | Westbury | ..................... 464/36 X |
| 5,314,381 | A | * | 5/1994 | Maurer | ........................ 464/36 X |

FOREIGN PATENT DOCUMENTS

| DE | 1675787 B1 | | 7/1970 | |
| JP | S494047 A | | 1/1974 | |
| JP | S6132826 U | | 2/1986 | |
| JP | S63112627 U | | 7/1988 | |
| SU | 1691617 A1 | * | 11/1991 | ...................... 464/36 |

OTHER PUBLICATIONS

Italian Search Report dated May 6, 2013, Italian Application No. Mo20120215 filed Sep. 11, 2012, 6 pages.

* cited by examiner

*Primary Examiner* — Gregory Binda
(74) *Attorney, Agent, or Firm* — Brooks Kushman P.C.

(57) ABSTRACT

A torque limiting device, particularly for power transmission elements, is provided. The torque limiting device includes a first connecting member and a second connecting member, which is connected rotatably to a driven element. The first connecting member includes a motor driving disk and the second connecting member includes a sliding disk, and further includes a pin supporting body which comprises a drum that is assembled on the second connecting member and includes a plurality of radial holes, each one of which accommodates a pin that is pressed, toward the center of the drum, by elastic means, and abuts, with at least one of its faces which is inclined with respect to the central rotation axis of the second connecting member, against at least one corresponding abutment face.

10 Claims, 3 Drawing Sheets

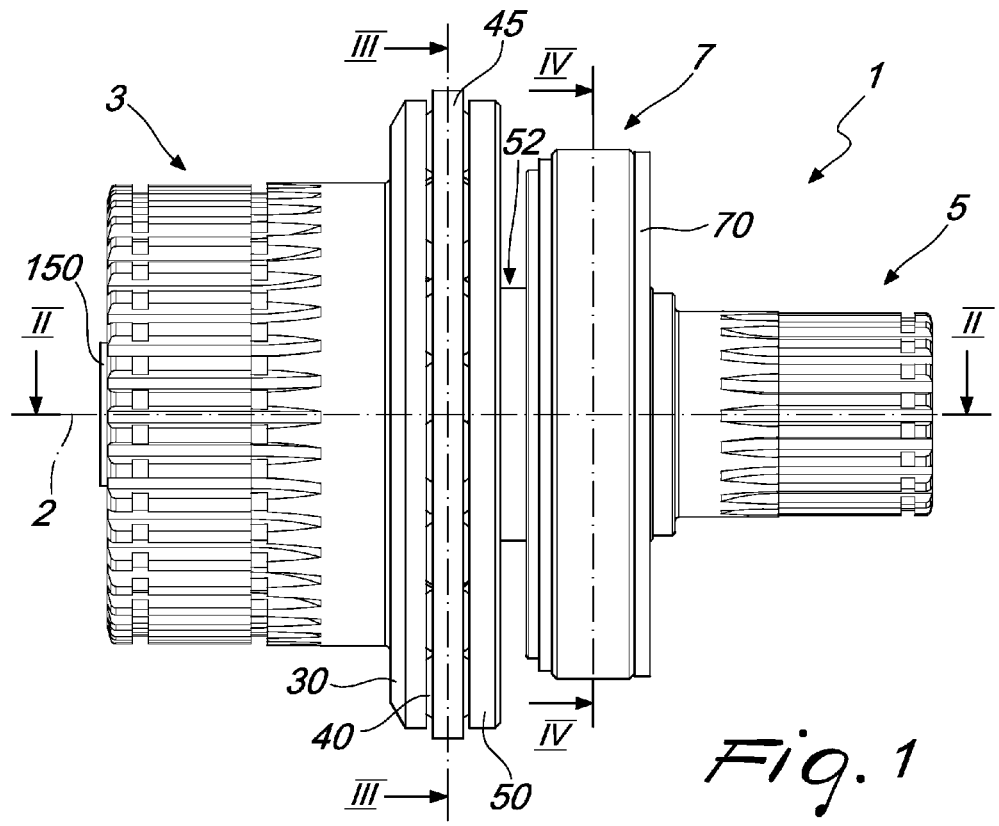
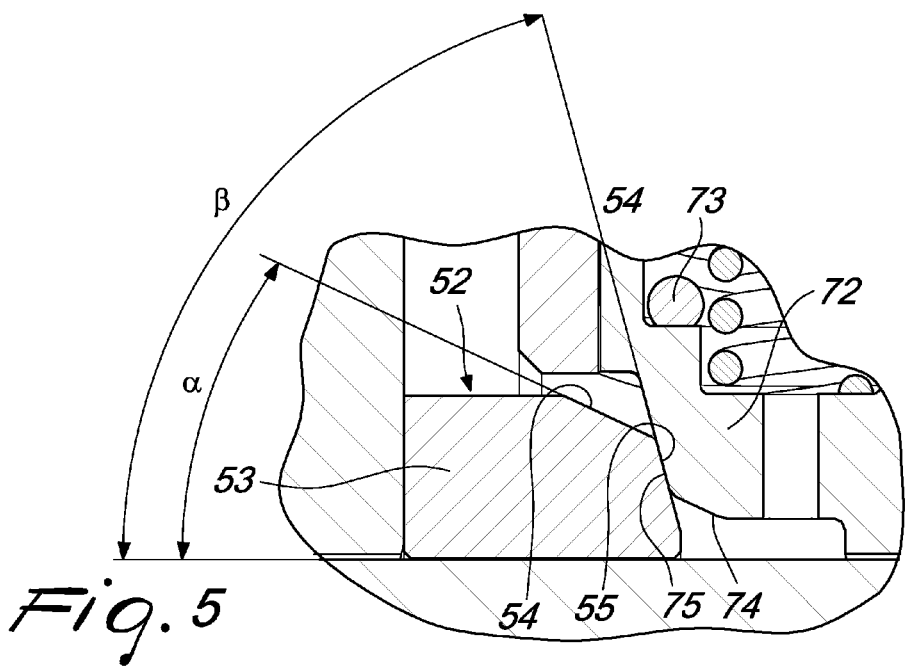
Fig. 1
Fig. 5

TORQUE LIMITING DEVICE, PARTICULARLY FOR POWER TRANSMISSION ELEMENTS

CROSS-REFERENCE TO RELATED APPLICATIONS

This application claims priority to Italian Patent Application No. MO2012A000215 filed Sep. 11, 2012, the disclosure of which is incorporated in its entirety by reference herein.

TECHNICAL FIELD

The present invention relates to a torque limiting device, particularly for power transmission elements.

BACKGROUND

The transmission of torque, in agriculture and in industry, usually occurs by way of transmission elements, or joints, which are capable of offering a system of protection against overloads, in order to protect the transmission from structural breakages that can go so far as to compromise the safety of the operator.

In agriculture, bolt torque limiters are known which do not allow automatic re-engagement of the transmission, although they do enable synchronized repositioning. Friction disk torque limiters are also known which enable automatic, but not synchronized, re-engagement of the transmission, as is the case with conventional torque limiters using pins.

In the industry, more widely known are torque limiters using cams to disengage, and torque limiters using balls, which enable automatic re-engagement and, if possible, synchronized re-engagement as well.

In torque limiters with pins, an external rotatable element, which is connected to the source of the motor torque, transmits the motion to a driven hub by way of a plurality of pins. On the heads of the pins a contoured profile is defined, which engages in adapted recesses which are provided in the inner surface of the external rotatable element. The head of each pin is pressed against the recesses thanks to a plurality of springs.

The transmission of the torque occurs thanks to the tangential force that develops between the profile defined by the recesses in the external rotatable element and the heads of the pins.

When the value of the moment of resistance of the driven hub increases, a radial thrust is generated on the pin which defeats the resisting force generated by the springs, releasing the head of the pin from the corresponding recess. The head thus rubs against the inner surface of the internal rotatable element, and the value of the torque transmitted decreases sharply to then increase when the pins re-engage in the recesses which follow immediately.

Transmission of the torque during the overload phase is not therefore completely cancelled, since the system allows a "repeating" re-engagement of the torque, effectively perpetuating the overload.

Such conventional torque limiters with pins have, however, the following drawbacks:
  correct operation of the protection system is not guaranteed at high speeds, for example higher than 700 rpm;
  during overload conditions there are strong vibrations on the transmission;
  there is a strong dependency of torque peaks on the elasticity of the system into which the limiter is introduced; often torque peaks occur after the triggering torque which have a value higher than the rating of the limiter;
  there are considerable axial encumbrances, in particular for torque limiters at torque values higher than 1000 Nm.

In conventional torque limiters with cam-operated disengagement, the driving hub transmits the motion to the driven body, which is usually provided with flanged geometry or forked, by way of a series of pins the heads of which engage with adapted seats which are provided in the driven body, by way of recesses which are generally trapezoidal in profile. The pins are free to move radially in cylindrical seats which are provided in the driving hub, into which low-friction bushes are always inserted in order to facilitate the sliding of the pin.

The pin has, in its lower part, a contoured base with a portion that protrudes, engaging between two cams which in turn are preloaded under pressure against each other, with helical or Belleville springs, and which have a contoured profile with two working angles.

The normal operation of the limiter is based on a balancing of two radial forces applied on the pin: a first force generated by the moment of resistance applied to the driven body and a second force generated by the contoured profile of the cams which are subjected to the thrust of the springs. These two working angles of the profile of the cam make it possible to have different values of such second radial force in the configuration of normal operation, with transmission of torque, with respect to the condition where motion is disengaged. In fact when the pin passes completely, with its contoured base, between the cams, the driving hub is free to rotate with respect to the driven body, without transmitting torque. In such configuration, the value of the working angle is such as to generate a low radial force, which is not capable of making the pin re-enter its seat in the driven body unless there is a strong reduction in speed.

One of the main drawbacks of torque limiters with cam-operated disengagement is the necessity to decelerate the rotation in order to make the pin re-enter its seat. Furthermore such torque limiters with cam-operated disengagement are particularly subject to wear of the moveable parts and their operation is ensured up to rotation speeds of 700 rpm.

In conventional torque limiters using balls, the torque is transmitted by means of a plurality of balls which are accommodated in seats provided both in a motor driving disk, which is connected to a driving element, and in a sliding disk, which faces the motor driving disk and is adapted to transmit the torque to a driven element. The balls are kept in their seats by a spring which is adjustable according to the cut-in torque value required, or alternatively by way of pneumatic or hydraulic systems.

In the event of an overload, the balls, defeating the resisting force exerted by the spring, exit from their seats, interrupting the transmission of torque. The movement of the sliding disk is monitored in order to actuate a switch or a safety sensor that is capable of stopping the kinematic chain within a time period that depends on the inertia of the system, and is capable of emitting an alarm signal.

Depending on the configuration and the arrangement of the balls and the corresponding seats between the motor driving disk and the sliding disk, these torque limiters using balls allow manual rearming, or automatic rearming, in a random position (not synchronized) or in a preset position (synchronized).

Such conventional torque limiters with balls have, however, the following drawbacks:
  as long as the overload condition lasts, the balls are subjected to maximal axial load forces, which thus limit the rolling thereof and generate hazardous rubbing which causes wear and raising of the working temperatures;

it is necessary to provide a motion arrest sensor for the overload phase, in order to prevent excessive wear which would compromise the functionality of the system, with consequent increase in the complexity and cost of the device;

in order to minimize high values of tangential forces acting on the balls, and excessive stresses on the respective accommodation seats, such torque limiters using balls have considerable radial dimensions, with consequent increase in encumbrances and in rotating inertia values.

SUMMARY

The aim of the present invention consists in providing a torque limiting device that solves the above-mentioned technical problems, eliminates the drawbacks and overcomes the limitations of the known art by making it possible to achieve the automatic and synchronized re-engagement of the transmission of torque.

Within this aim, an object of the present invention is to provide a torque limiting device associated with reduced wear of the moveable parts.

Another object of the invention consists in providing a torque limiting device that is contained in size with respect to conventional torque limiters.

Another object of the invention consists in providing a torque limiting device that ensures an efficient interruption of transmission and thus an optimal protection of the elements in motion, without having to provide additional electronic sensors.

Another object of the invention consists in providing a torque limiting device that is capable of offering the widest guarantees of reliability and safety of use and is easy to provide and economically competitive in comparison to the known art.

This aim and these and other objects which will become more apparent hereinafter are all achieved by a torque limiting device, particularly for power transmission elements, comprising a first connecting member, which is connected rotatably to a driving element, and a second connecting member, which is connected rotatably to a driven element, the first connecting member comprising a motor driving disk, the second connecting member comprising a sliding disk that is adapted to slide axially with respect to the second connecting member, the motor driving disk and the sliding disk being able to face each other and each comprising, on the respective abutment faces, a plurality of conical seats, each one of the conical seats being adapted to accommodate a ball, characterized in that it comprises a pin supporting body which comprises a drum that is assembled on the second connecting member, the drum comprising a plurality of radial holes, each of which accommodates a pin that is adapted to slide radially in the radial hole, each one of the pins being pressed, toward the center of the drum, by elastic means, and abutting, with at least one of its faces which is inclined with respect to the central rotation axis of the second connecting member, against at least one corresponding abutment face, which is substantially parallel to the at least one inclined face of the pin, and is provided in a portion of the sliding disk, the axial movement of the sliding disk, as the contrasting torque provided by the second connecting member increases, being contrasted by the radial compression thrust of the pins, by the elastic means, at the inclined face of the pins that presses against the corresponding abutment face provided in the portion of the sliding disk.

BRIEF DESCRIPTION OF THE DRAWINGS

Further characteristics and advantages of the invention will become more apparent from the detailed description of a preferred, but not exclusive, embodiment of a torque limiting device, particularly for power transmission elements, which is illustrated by way of non-limiting example with the help of the accompanying drawings wherein:

FIG. 1 is a side view of an embodiment of a torque limiting device, according to the invention;

FIG. 5 is an enlarged-scale detail of the torque limiting device in FIG. 2, showing in particular how the sliding disk engages with a pin.

DETAILED DESCRIPTION

Figure 2:
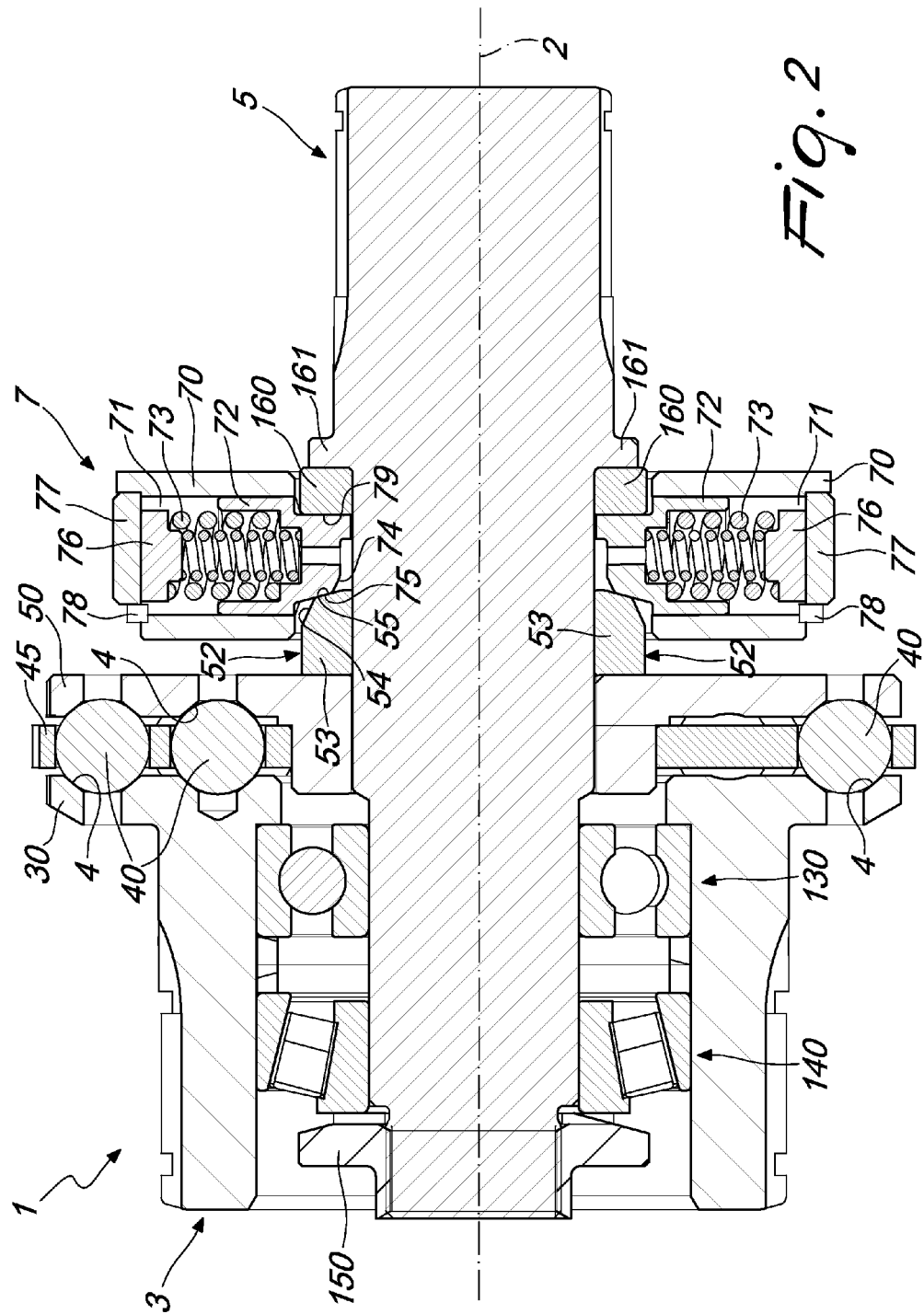
FIG. 2 is a sectional view of the torque limiting device shown in FIG. 1, taken along the line II-II.
Figure 3:
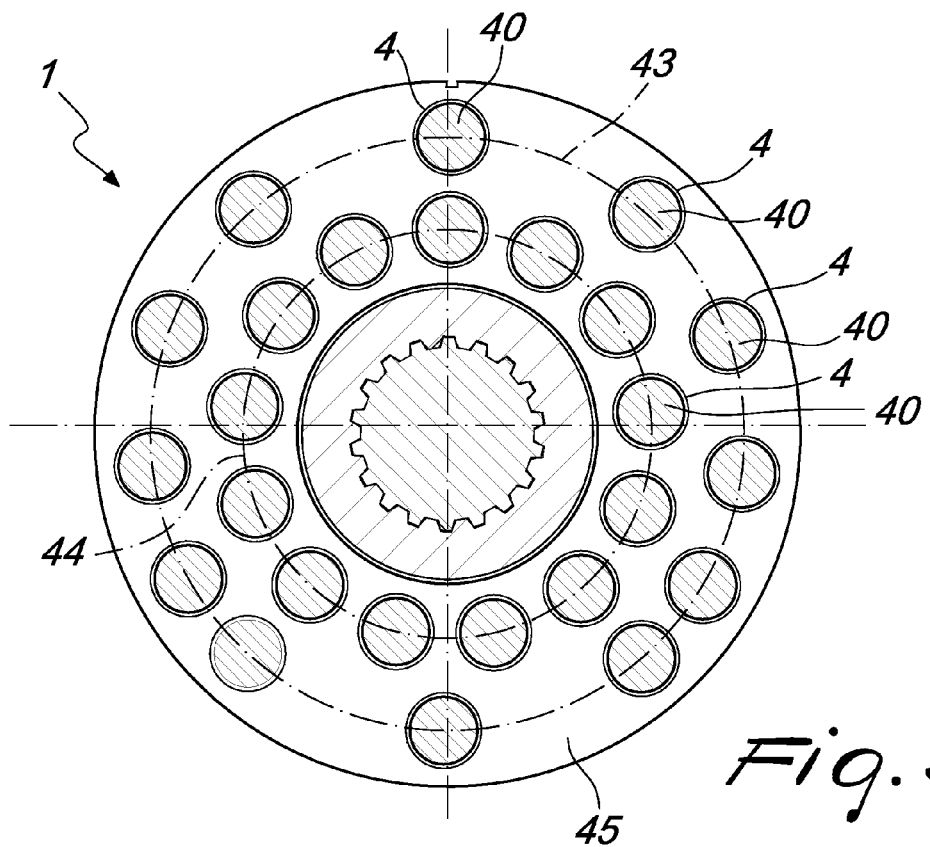
FIG. 3 is a sectional view of the torque limiting device shown in FIG. 1, taken along the line III-III.
Figure 4:
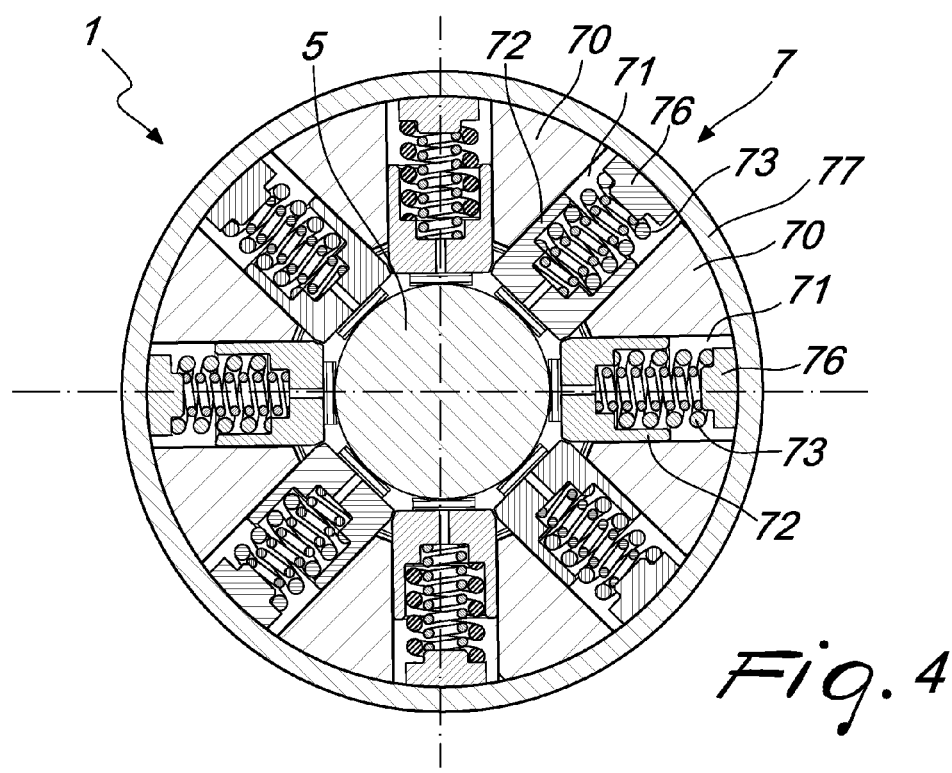
FIG. 4 is a sectional view of the torque limiting device shown in FIG. 1, taken along the line IV-IV.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to the figures, the torque limiting device, particularly for power transmission elements, generally designated by the reference numeral 1, comprises a first connecting member 3, which is connected rotatably to a driving element which generates the motor torque, and a second connecting member 5, which is connected rotatably to a driven element. The first connecting member 3 comprises a motor driving disk 30 while the second connecting member 5 comprises a sliding disk 50 that is adapted to slide axially with respect to the second connecting member 5. The motor driving disk 30 and the sliding disk 50 are able to face each other and each comprises, on the respective abutment faces, a plurality of conical seats 4, each one of which is adapted to accommodate a ball 40. The transmission of motion between the first connecting member 3, which is connected to the driving element, i.e. to the motor torque source, and the second connecting member 5, which is connected to the driven element, i.e. to the resisting element, occurs by way of the balls 40 which are accommodated in the conical seats 4 which are provided in the motor driving disk 30 and in the sliding disk 50.

According to the invention, the torque limiting device 1 comprises a pin supporting body 7 which comprises a drum 70 that is assembled on the second connecting member 5. The drum 70 comprises a plurality of radial holes 71, each of which accommodates a pin 72 that is adapted to slide radially in the radial hole 71. Each one of the pins 72 is pressed, toward the center of the drum 70, by elastic means 73, and abuts, with at least one of its faces 74 or 75 which is inclined with respect to the central rotation axis 2 of the second connecting member 5, against at least one corresponding abutment face 54 or 55, which is substantially parallel to the inclined face 74 or 75 of the pin 72, and is provided in a portion 52 of the sliding disk 50. The axial movement of the sliding disk 50, as the contrasting torque provided by the second connecting member 5, which is connected to the driven element, increases, is contrasted by the radial compression thrust of the pins 72, by the elastic means 73, at the inclined face 74 or 75 of the pins 72 that presses against the corresponding abutment face 54 or 55 provided in the aforementioned portion 52 of the sliding disk 50.

The sliding disk 50 advantageously comprises a splined hub which is adapted to transmit the torque to the second connecting member 5 which is connected to the driven element. As noted above, the sliding disk 50 is capable of sliding axially on the second connecting member 5, for example along the splined hub.

Advantageously, in the torque limiting device 1, each one of the pins 72 comprises two faces 74 and 75, which are inclined differently with respect to the central axis 2 and are adapted to engage respectively two abutment faces 54 and 55 which are provided in the portion 52 of the sliding disk 50. Such abutment faces 54 and 55 are respectively substantially parallel to the two faces 74 and 75 of the pins 72. The first pair of faces 74-54 defines, with respect to the central axis 2, a working angle, indicated by $\alpha$ in FIG. 5, which is smaller than the working angle defined by the second pair of faces 75-55, and indicated by $\beta$ in FIG. 5, so that the value of the axial thrust transmitted by the pins 72 to the sliding disk 50 is proportional to the working angle.

Preferably, the torque limiting device 1 comprises a cage 45 which is interposed between the motor driving disk 30 and the sliding disk 50, and which accommodates the balls 40 thus keeping them in position.

The conical seats 4 of the balls 40 can be advantageously arranged along a plurality of concentric tracks 43, 44, so that the angular distribution of such conical seats along the respective concentric tracks 43, 44 defines the synchronization angle of the torque limiting device 1.

The portion 52 of the sliding disk 50, which is provided with the abutment faces 74, 75 which are inclined with respect to the central axis, can be constituted by a wedge-like ring 53, which is interposed between the sliding disk 50 and the pins 72.

The wedge-like ring 53 can be an independent element or it can be integral with the sliding disk 50.

Advantageously, at least one radial ball bearing 130, and/or a conical roller 140, is interposed between the first connecting member 3 and the second connecting member, each one being adapted to maintain the first connecting member 3 and the second connecting member 5 in axial alignment and to absorb the axial thrusts of the sliding disk 50.

Preferably each one of the elastic means 73 is kept guided within each one of the radial holes 71 of the drum 70 of the pin supporting body 7, by the pins 72, and rests on a pad 76 which defines a resting surface for such elastic means 73. The set of pins 72, elastic means 73 and pads 76 is enclosed radially in a cylinder 77 which is fitted on the drum 70 and is fixed axially by a ring for shoulders 78.

The torque limiting device 1 can furthermore advantageously comprise a locking ring 150 which is adapted to set the axial preloading value of the torque limiting device 1 in the initial configuration.

Furthermore the torque limiting device 1 can comprise a flat abutment ring 160 which abuts, on one side, against a shoulder 161 provided in the second connecting member 5, and, on the opposite side, against a second face 79 of each one of the pins 72 which is substantially opposite, in the axial direction, to the face 74, 75 which is inclined with respect to the central axis 2.

The flat abutment 160 can be an independent element or it can be integral with the connection element 5.

The torque limiting device 1 can advantageously also comprise electronic sensors that are adapted to detect the axial movement of the sliding disk 50, so as to have further evidence that an overload condition has arisen.

The operation of the torque limiting device, particularly for power transmission elements, is described below.

Starting from an initial preloading configuration that ensures the absence of play between balls 40, motor driving disk 30 and sliding disk 50, as the contrasting torque imposed by the driven element on the second connecting member 5 increases, due to the conical geometry of the conical seats 4, an axial thrust is generated between the two disks 30 and 50 which tends to drive the sliding disk 50 away from the motor driving disk 30 and release the balls 40 from the respective conical seats 4.

The axial movement of the sliding disk 50 is contrasted by the thrust which is generated by the compression of the elastic means 73 on the pins 72 that can slide radially in the radial hole 71: an axial movement of the sliding disk 50 therefore corresponds to a radial movement of the pin 72 and a development of contrasting axial force on the wedge-like ring 53 that presses against the sliding disk 50.

The value of the axial thrust transmitted by the pins 72 to the wedge-like ring 53 depends on the radial position engaged by the pin 72 since, depending on its "working height", an axial thrust is generated which is directly proportional to the angles $\alpha$ and $\beta$. If the value of the angle $\alpha$, corresponding to the pair of faces 54-74, is smaller than the value of the angle $\beta$, corresponding to the pair of faces 55-75, then the aforementioned axial thrust is greater when the faces 55-75 that define the angle $\beta$ are mutually facing and in mutual engagement.

The maximum rating of the torque limiting device 1 is obtained when the pin 72 passes from the working angle $\beta$ to the working angle $\alpha$.

The torque rating of the device 1 depends therefore on the elastic constant of the elastic means 73, on the value of the working angle $\beta$ of the pins 72, and on the axial movement of the sliding disk 50.

During the disengagement step, the balls 40 are free to slide on the concentric tracks 43, 44, which are provided on the opposite faces of the sliding disk 50 and of the motor driving disk 30, under the action of a very low axial thrust that depends on the working angle $\alpha$ of the pins 72 and remaining guided by the cage 45. The sliding of the balls 40 at a low compression force in the concentric tracks 43, 44 prevents the transmission of a high residual torque between the two disks 30 and 50, i.e. between the first connecting member 3 and the second connecting member 5.

A correct synchronization between the balls 40 positioned on one or more concentric tracks can enable a synchronized restoration of the transmission of torque between the first connecting member 3 and the second connecting member 5, with selected angles dictated by the functional characteristics of the application.

Restoration of the transmission of the torque occurs when the balls 40 are back in their conical seats 4: by returning to their seats, the balls 40 make it possible for the sliding disk 50 to return to its original position, as shown in the FIGS., such as FIGS. 2 and 5, for example, and for the pins 72 to assume the working position resting on the angle $\alpha$. Until the contrasting torque is higher than the maximum rating value, the torque limiting device 1 will continue to disengage/re-engage for a number of times which depends on the synchronization of re-engagement and the limit value of which can be every 360° or multiples of 360°.

The torque limiting device 1 makes it possible, depending on the magnitude of the angle $\alpha$, to select lower axial load conditions, in order to minimize the wear of the balls 40 and of the concentric sliding tracks 43, 44, for smaller values of α, or higher axial load conditions, to favor conditions of re-engagement every 360°.

In the first condition (smaller values of α), the low axial force value will allow a synchronized re-engagement for multiples of 360° thus enabling the torque limiter to operate even at high speeds, greater than 1000 rpm. Re-engagement of the motion will be allowed once the operating speed decreases. In this configuration the transmission is quieter during overloads since vibrations will be reduced on the transmission. The value of residual torque transmitted during the overload is minimal. This configuration is therefore suitable for applications with a high frequency of overloads in which a long lifetime of the system is furthermore required.

In the second configuration (bigger values of α) the synchrony of the transmission is maintained, and the noise level induced by the more frequent re-engagement conditions helps the operator to perceive an overload situation, as often required in agricultural applications. The 360° synchronization still limits the number of engagements thus helping to reduce wear of the parts.

In practice it has been found that the torque limiting device, particularly for power transmission elements, according to the present invention, achieves the intended aim and objects in that it makes it possible to achieve the automatic and synchronized re-engagement of the transmission of torque, while reducing the wear of the moveable parts.

Another advantage of the torque limiting device, according to the invention, consists in separating the elements that transmit the torque from the elements for the adjustment of the torque, thus rendering the operation of the device less sensitive to conditions of surface finish and of lubrication of the regions where the pins slide.

The torque limiting device, thus conceived, is susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A torque limiting device, for power transmission elements, the torque limiting device comprising:
    a first connecting member, which is connected rotatably to a driving element including a motor driving disk;
    a second connecting member, which is connected rotatably to a driven element, and including a sliding disk that is adapted to slide axially with respect to the second connecting member, the motor driving disk and the sliding disk being able to face each other and each comprising, on the respective abutment faces, a plurality of conical seats, each one of the conical seats being adapted to accommodate a ball;
    a pin supporting body which includes a drum that is assembled on the second connecting member, the drum including a plurality of radial holes; and
    a plurality of pins, wherein at least one pin is accommodated in each of the radial holes and is adapted to slide radially in the radial hole, each one of the pins being pressed, toward the center of the drum, by elastic means, and abutting, with at least one inclined face of each one of the pins which is inclined with respect to the central rotation axis of the second connecting member, against at least one corresponding abutment face, which is substantially parallel to the at least one inclined face of the pin, and is provided in a portion of the sliding disk, the axial movement of the sliding disk, as the contrasting torque provided by the second connecting member increases, being contrasted by the radial compression thrust of the pins, due to the elastic means, at the inclined face of the pins that presses against the corresponding abutment face provided in the portion of the sliding disk.

2. The torque limiting device according to claim 1, wherein each one of the pins comprises two faces, which are inclined differently with respect to the central axis and are adapted to engage respectively two abutment faces which are provided in the portion of the sliding disk and are respectively substantially parallel to the two differently inclined faces of the pins, the first pair of faces defining a working angle with respect to the central axis that is smaller than the working angle defined by the second pair of faces, so that the value of the axial thrust transmitted by the pins to the sliding disk is proportional to the working angle.

3. The torque limiting device according to claim 1, further comprising a cage which is interposed between the motor driving disk and the sliding disk, the cage accommodating the balls.

4. The torque limiting device according to claim 1, wherein the conical seats are arranged on a plurality of concentric tracks, an angular distribution of the conical seats along the concentric tracks defining a synchronization angle of the torque limiting device.

5. The torque limiting device according to claim 1, further comprising a wedge-like ring which constitutes the portion of the sliding disk that has the at least one abutment face that is inclined with respect to the central axis.

6. The torque limiting device according to claim 1, wherein at least one radial ball bearing is interposed between the first connecting member and the second connecting member and is adapted to keep the first connecting member and the second connecting member in axial alignment and to absorb the axial thrusts of the sliding disk.

7. The torque limiting device according to claim 1, wherein at least one conical roller is interposed between the first connecting member and the second connecting member and is adapted to keep the first connecting member and the second connecting member in axial alignment and to absorb the axial thrusts of the sliding disk.

8. The torque limiting device according to claim 1, wherein the elastic means is kept guided within each one of the radial holes of the drum by each one of the pins, and rests on a pad which defines a resting surface for the elastic means for each one of the pins, the set of the pins, the elastic means for each one of the pins, and the pads being enclosed radially in a cylinder which is fitted on the drum and is fixed axially by a ring.

9. The torque limiting device according to claim 1, further comprising a locking ring which is adapted to set an axial preloading value of the torque limiting device in an initial configuration.

10. The torque limiting device according to claim 1, further comprising a flat abutment ring which abuts, on one side, against a shoulder provided in the second connecting member and, on an opposite side, against a second face of each one of the pins which is substantially opposite, in an axial direction, to the at least one inclined face which is inclined with respect to the central rotation axis.

* * * * *